(12) United States Patent
Takahashi

(10) Patent No.: US 6,353,480 B1
(45) Date of Patent: Mar. 5, 2002

(54) MULTI-MODE PRINTING CONTROL SYSTEM

(75) Inventor: Hiroharu Takahashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/395,928

(22) Filed: Sep. 14, 1999

Related U.S. Application Data

(62) Division of application No. 08/951,458, filed on Oct. 16, 1997, now Pat. No. 6,002,848, which is a continuation of application No. 07/871,738, filed on Apr. 21, 1992, now abandoned.

(30) Foreign Application Priority Data

Apr. 23, 1991 (JP) .............................................. 3-092306

(51) Int. Cl.[7] .............................................. G06K 15/00
(52) U.S. Cl. ...................................... 358/1.13; 358/1.2
(58) Field of Search ................................ 358/1.13, 1.15, 358/1.14, 1.16, 1.17, 1.18, 1.12, 1.11, 1.9, 1.6, 1.5, 1.2, 1.1, 518, 523, 451, 462, 467, 468, 404, 444, 447, 540, 450, 453, 455, 448; 382/173, 176, 180, 264, 275, 299, 298, 300, 301; 345/428, 3.3, 3.4

(56) References Cited

U.S. PATENT DOCUMENTS

| | | | |
|---|---|---|---|
| 4,004,079 A | 1/1977 | Boston | 358/256 |
| 4,668,995 A | 5/1987 | Chen et al. | 258/282 |
| 4,878,068 A | 10/1989 | Suzuki | 346/108 |
| 4,942,541 A | 7/1990 | Hoel et al. | 364/519 |
| 4,996,603 A | 2/1991 | Kanemitsu et al. | 358/462 |
| 5,001,576 A | 3/1991 | Tanaka et al. | 358/462 |
| 5,084,831 A | 1/1992 | Morikawa et al. | 395/116 |
| 5,125,072 A | 6/1992 | Ng | 395/112 |
| 5,129,048 A | 7/1992 | Ng | 395/110 |
| 5,226,098 A | 7/1993 | Hirosawa | 358/61 |
| 5,299,308 A | 3/1994 | Suzuki et al. | 395/162 |
| 5,309,548 A | 5/1994 | Ohta et al. | 395/109 |
| 5,327,265 A | 7/1994 | McDonald | 358/527 |
| 5,355,231 A | 10/1994 | Murata | 358/443 |
| 5,467,431 A | * 11/1995 | Ishiguro et al. | 358/1.2 |
| 6,002,848 A | * 12/1999 | Takahashi | 358/1.17 |

FOREIGN PATENT DOCUMENTS

| | | |
|---|---|---|
| EP | 229 539 A | 7/1987 |
| EP | 310 228 A | 4/1989 |
| EP | 311 111 A | 4/1989 |
| EP | 388160 | 9/1990 |
| JP | 62-212163 | 9/1987 |
| JP | 1-075252 | 3/1989 |
| JP | 2-185464 | 7/1990 |

OTHER PUBLICATIONS

"Resolution Switching For Supporting Plotter Graphics On A Page Printer", IBM Technical Disclosure Bulletin, vol. 32, No. 9A, Feb., 1990, p. 168.

R.K. deBry, et al., "Architectures of Advanced Function Printing", IBM Systems Journal, vol. 27, No. 2, 1988, pp. 234–245.

* cited by examiner

Primary Examiner—Dov Popovici
(74) Attorney, Agent, or Firm—Fitzpatrick, Cella, Harper & Scinto

(57) ABSTRACT

An apparatus and a method for generating and outputting image data. The method and apparatus includes inputting information output from an external apparatus, judging whether or not the inputted information includes specific control data, and controlling switching between a plurality of modes based on whether the inputted information includes the specific control data. The plurality of modes including a first mode in which the image data is converted into a video signal in parallel with description processing of the image data and a second mode in which the image data is converted into the video signal after the description processing of one page of the image data is performed.

10 Claims, 9 Drawing Sheets

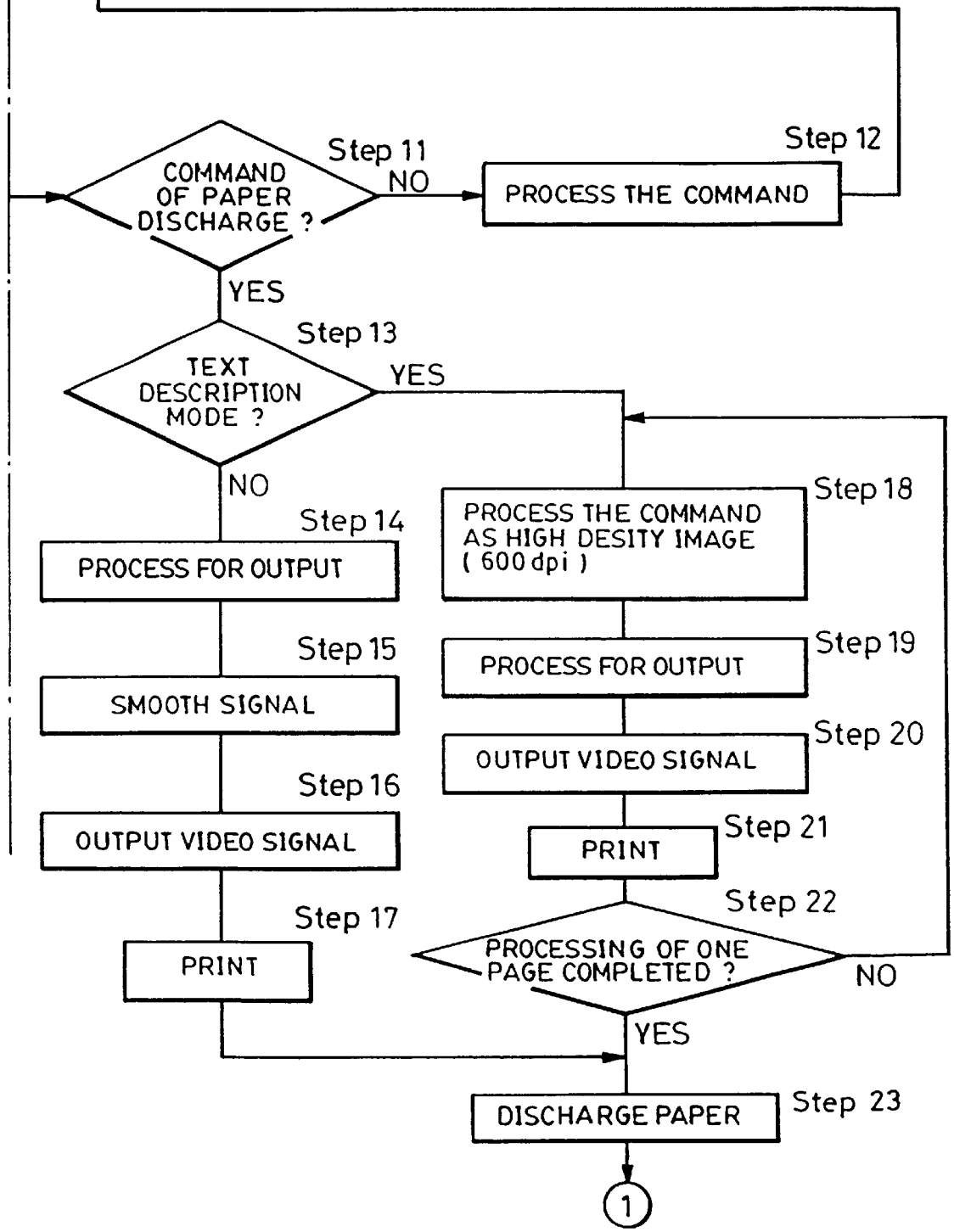

| FIG. 5(A) | FIG. 5(B) |

FIG. 7(a)  [CSI] &¥ : A COMMAND TO SHIFT FROM TEXT DESCRIPTION TO GRAPHIC DESCRIPTION

FIG. 7(b)  [ESC] %$ : A COMMAND TO SHIFT FROM GRAPHIC DESCRIPTION TO TEXT DESCRIPTION

MULTI-MODE PRINTING CONTROL SYSTEM

This application is a divisional of application Ser. No. 08/951,458, filed Oct. 16, 1997, now, U.S. Pat. No. 6,002,848, issued on Dec. 14, 1999, which was a continuation of application Ser. No. 07/871,738, filed Apr. 21, 1992, now abandoned.

BACKGROUND OF THE INVENTION

1. Field of the Invention

The present invention relates to an output method and an apparatus employing such a method which requires a relatively small memory capacity in order to output information received from a host computer as high-density data.

2. Description of the Related Art

Output apparatuses such as laser beam printers are generally used to output data from computers. Laser beam printers of low density, e.g. 300 dpi, have been increasingly employed because of their quiet operation, reasonable price and compact size.

Recently, the development of a higher-density printer engine unit has been undertaken in order to further upgrade the print quality. A high-density printer engine of 600 dpi has now been developed. A printer controller for such a printer engine analyzes printing information sent to it and, according to the analysis, develops the printing information over the bit map memory, at a designated density. In the known art, it is required for the printer controller to have a bit map memory capacity corresponding to the print density of the printer engine connected thereto. For example, the memory of the controller connected to a printer engine of 600 dpi is required to be four times as large as that of the controller connected to a printer engine of 300 dpi.

Since a controller for high-density printing (600 dpi) must employ a bit map memory four times as large as that employed by a controller for low-density printing (300 dpi), a high-density (600 dpi) laser beam printer employing such a controller and engine becomes rather large and expensive, especially in a situation where color or half-tone images are to be formed.

SUMMARY OF THE INVENTION

It is an object of the present invention to solve the above-mentioned problems by providing an output method and an apparatus wherein data received, e.g. from a host computer, is analyzed, and wherein, according to the analysis, one page of the data of text description is divided into portions (or bands) to be serially developed as a high-density image (600 dpi) on the bit map memory (band processing) and to be serially printed, and one page of the data of graphic description is developed as a low-density image (300 dpi) on the bit map memory and is smoothed before output.

Another object of the present invention is to provide an output method and an output apparatus wherein highly-defined printing can be performed by a high-density (600 dpi) laser beam printer employing a bit map memory having the same capacity as the bit map memory employed in a conventional printer controller of low-density printing (300 dpi).

Still another object of the present invention is to provide an output method comprising the steps of: analyzing print data, e.g., from a host computer, to determine whether it is text data or graphic data; developing text data as dot patterns of high resolution; and developing graphic data as dot patterns of low resolution.

A further object of the present invention is to provide an output apparatus comprising: an analyzing means for analyzing print data inputted thereto; and a developing means which, according to the analysis by the analyzing means, develops test data as dot patterns of high resolution and graphic data as dot pattern of low density.

Further objects, features and advantages of the present invention will become apparent in the following description of the preferred embodiments with reference to the attached drawings.

BRIEF DESCRIPTION OF THE DRAWINGS

FIG. 2, comprising FIGS. 2(A) and 2(B), is a flowchart of printing control according to the embodiment illustrated in FIG. 1.

FIGS. 5(A) and 5(B), is a flowchart of printing control according to another embodiment of the present invention.

FIG. 7 shows exemplary commands.

DETAILED DESCRIPTION OF THE PREFERRED EMBODIMENTS

[One Embodiment]

Figure 6:
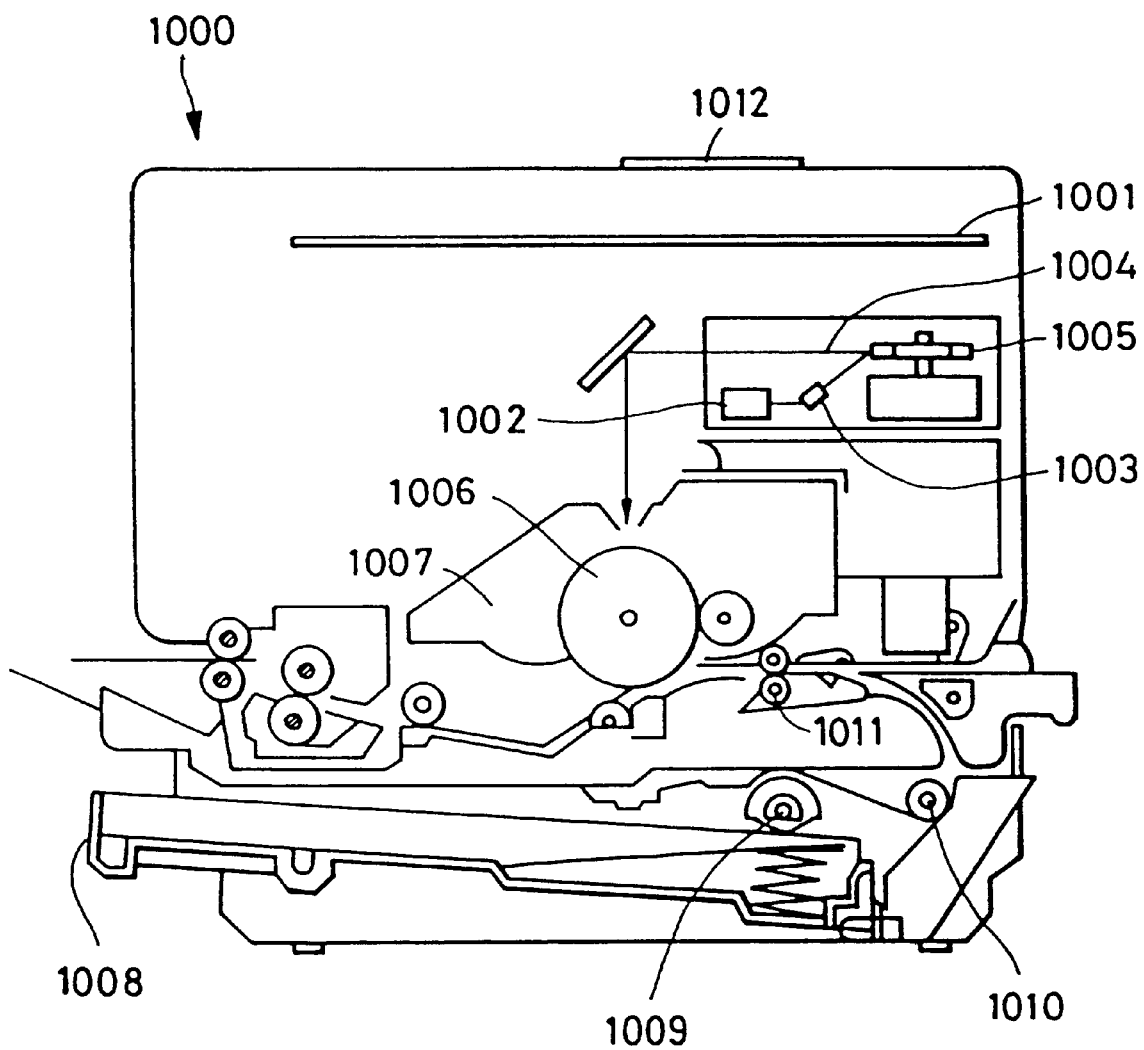
FIG. 6 illustrates the internal construction of a laser beam printer according to the present invention.

FIG. 6 shows a laser beam printer (referred to as "an LBP" hereinafter) according to this embodiment, which is able to register character patterns and form data received from a data source, i.e. a host computer (not shown).

Referring to FIG. 6, an LBP 1000 (corresponding to numeral 2 in FIG. 1) receives and stores the information from a host computer (denoted by numeral 1 in FIG. 1), e.g. character information (character code), form data and macro instructions. According to the information, the LBP 1000 generates character patterns, form patterns, etc., to form an image on a recording medium such as recording paper. An operation panel 1012 has a switch, an LED display, etc. arranged thereon. A printer control unit 1001 performs overall control of the LBP and analyzes information, such as character information, received from the host computer. The printer control unit 1001 converts the character data into video signals of the corresponding character patterns and sends the video signals to a laser driver 1002.

The laser driver 1002 is a circuit which drives a semiconductor laser 1003. According to the video signals from the printer control unit 1001, the laser driver 1002 switches on and off the laser beam emission of the semiconductor laser 1003. The laser beam 1004 is reflected by a rotary polygon mirror 1005 for scanning the surface of an electrostatic drum 1006. An electrostatic latent image of the character patterns is thus formed on the electrostatic drum 1006. The latent image is developed by a developer unit 1007 provided near the surface of the electrostatic drum 1006. The developed image is transferred to recording paper. The recording paper used is of a cut-sheet type. The cut-sheet recording papers are stored in a paper cassette 1008, which is mounted to the LBP 1000. A pick-up roller 1009 and conveying rollers 1010, 1011 feed a cut-sheet recording paper from the cassette 1008 to the electrostatic drum 1006 inside the apparatus.

Figure 1:
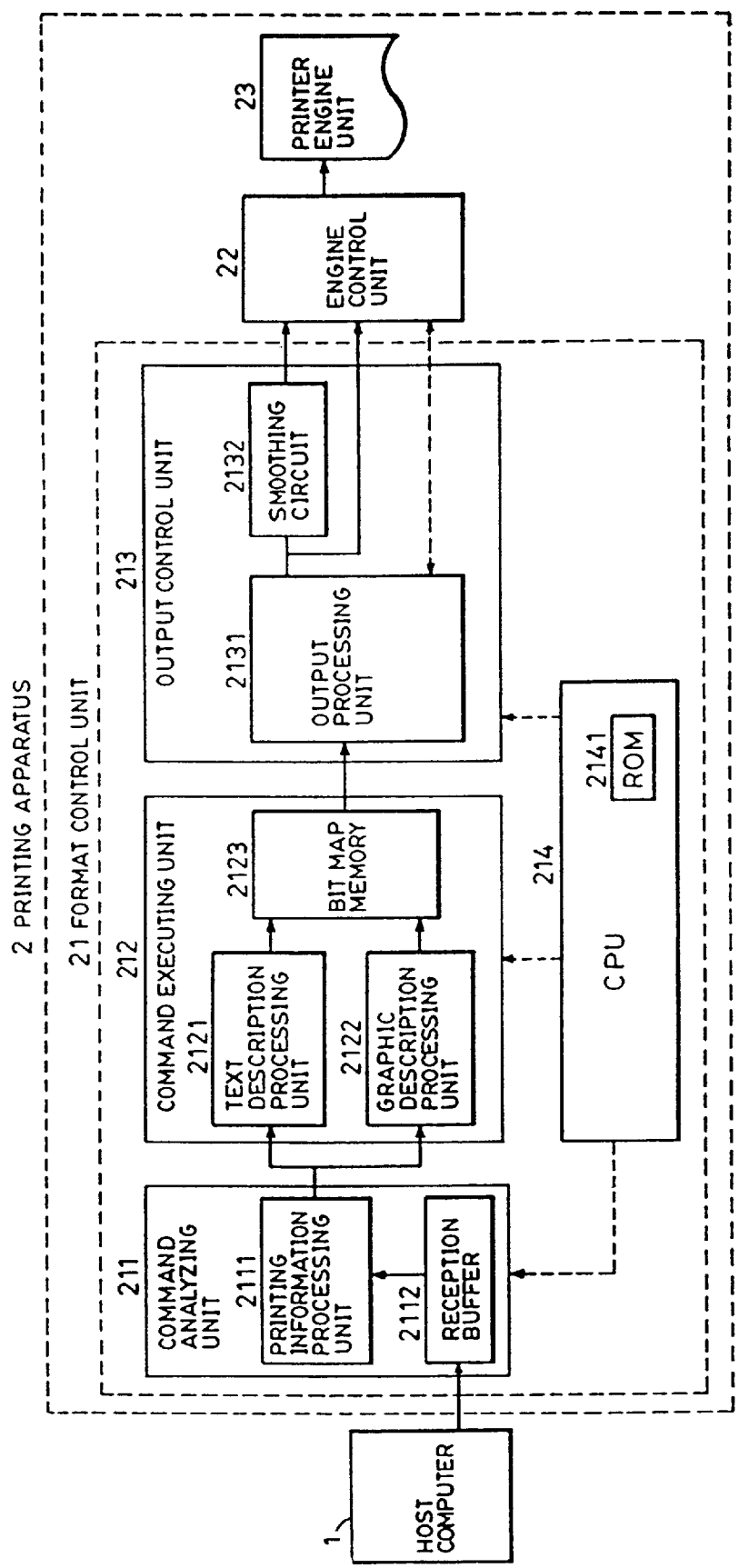
FIG. 1 is a block diagram of the basic construction of a printing apparatus according to one embodiment of the present invention.

The construction of the system according to this embodiment is illustrated in FIG. 1. In this figure, a host computer 1 outputs printing data including print data and control codes to a printing apparatus 2.

The printing apparatus 2 is composed of format control unit 21, an engine control unit 22 and a printer engine unit 23. The format control unit 21 is in turn composed of a command analyzing unit 211, a command executing unit 212, and an output control unit 213, and the format control unit 21 comprises a printing control means according to the present invention. The printing information from the host computer 1 is stored in a reception buffer 2112, and is analyzed by a printing information processing unit 2111. The information processing unit 2111 determines whether the received printing information is a command concerning text description or a command concerning graphic description or a command of another kind. FIG. 7(*a*) shows a representative command for graphic description. If processing unit 2111 encounters a command like that in FIG. 7(A), then graphic description processing is performed. If, on the other hand, processing unit 2111 encounters a command like that in FIG. 7(*b*), which is a representative command for text description, then text description processing is performed.

Commands not concerning text or graphic description are executed by a command analyzing unit 211. A command concerning description is executed by a command executing unit 212. In the text description processing, text data is operated by a text description processing unit 2121, and the processed data is serially developed into dot data over a bit map memory 2123. In the graphic description processing, graphic data is operated by a graphic description processing unit 2122, and the processed data is serially developed into dot data over a bit map memory 2123. The developed dot data in either of the processings is serially sent to an output processing unit 2131 of an output control unit 213. The output processing unit 2131 converts the data from the bit map memory 2123 into a video signal. Graphic description data is processed to upgrade print quality by a smoothing circuit 2132 before conversion to a video signal. The video signal is outputted to the engine control unit 22. The output processing unit 2131 also exchanges information, as depicted by the dotted arrow, such as engine control commands and the status of various actions of a printer engine, with the engine control unit 22 in order to adjust the timing of image transfer to the engine control unit 22. A CPU 214 controls the overall control system of the format control unit 21, according to the control program of the CPU 214 stored in a ROM 2141. The engine control unit 22 controls various printing means of a printer engine unit 23. The printer engine unit 23 forms a permanently visible image on recording paper from the image described on the bit map memory according to the printing information received from the host computer.

Figure 2A:
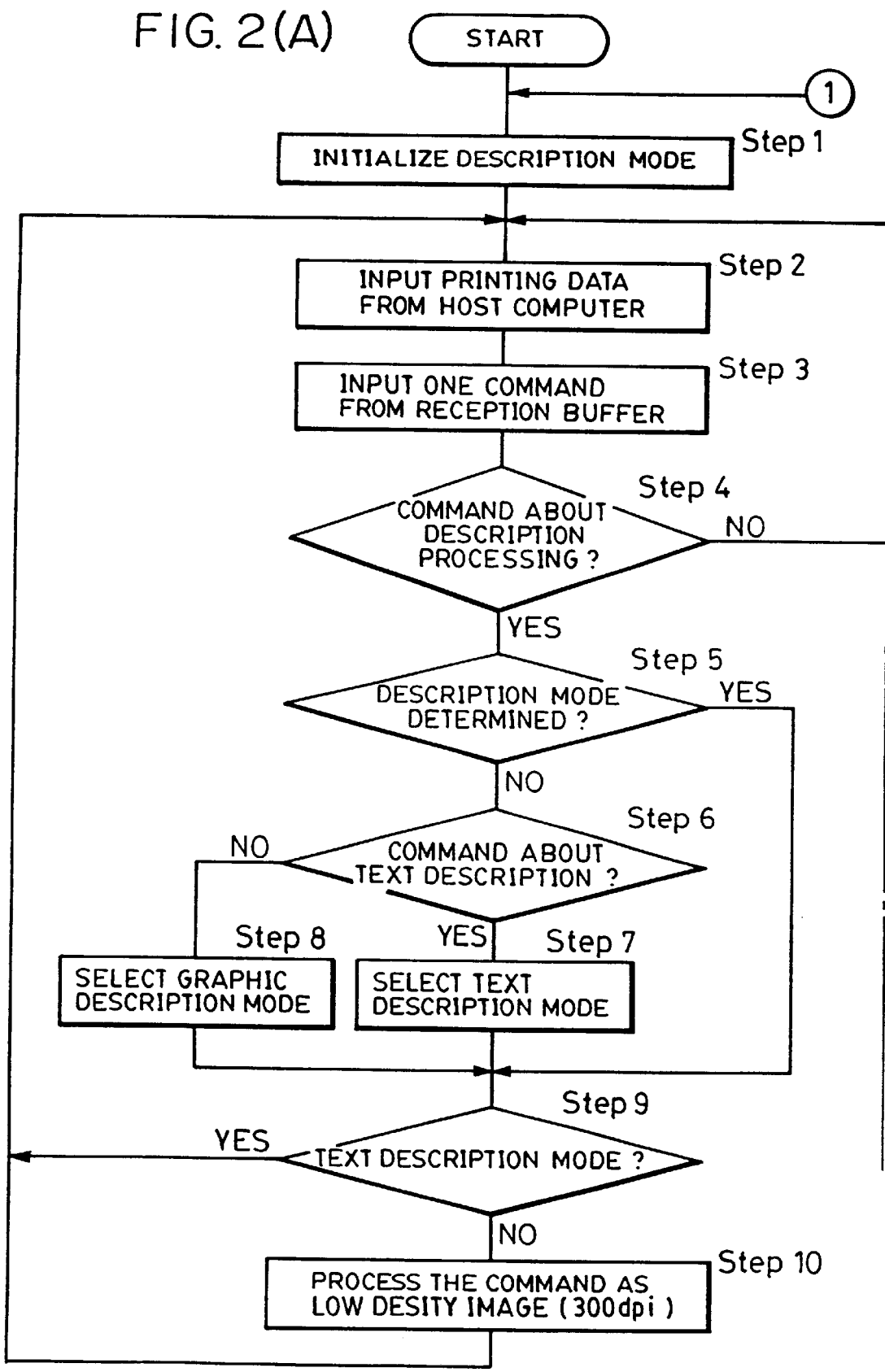
Figure 3:
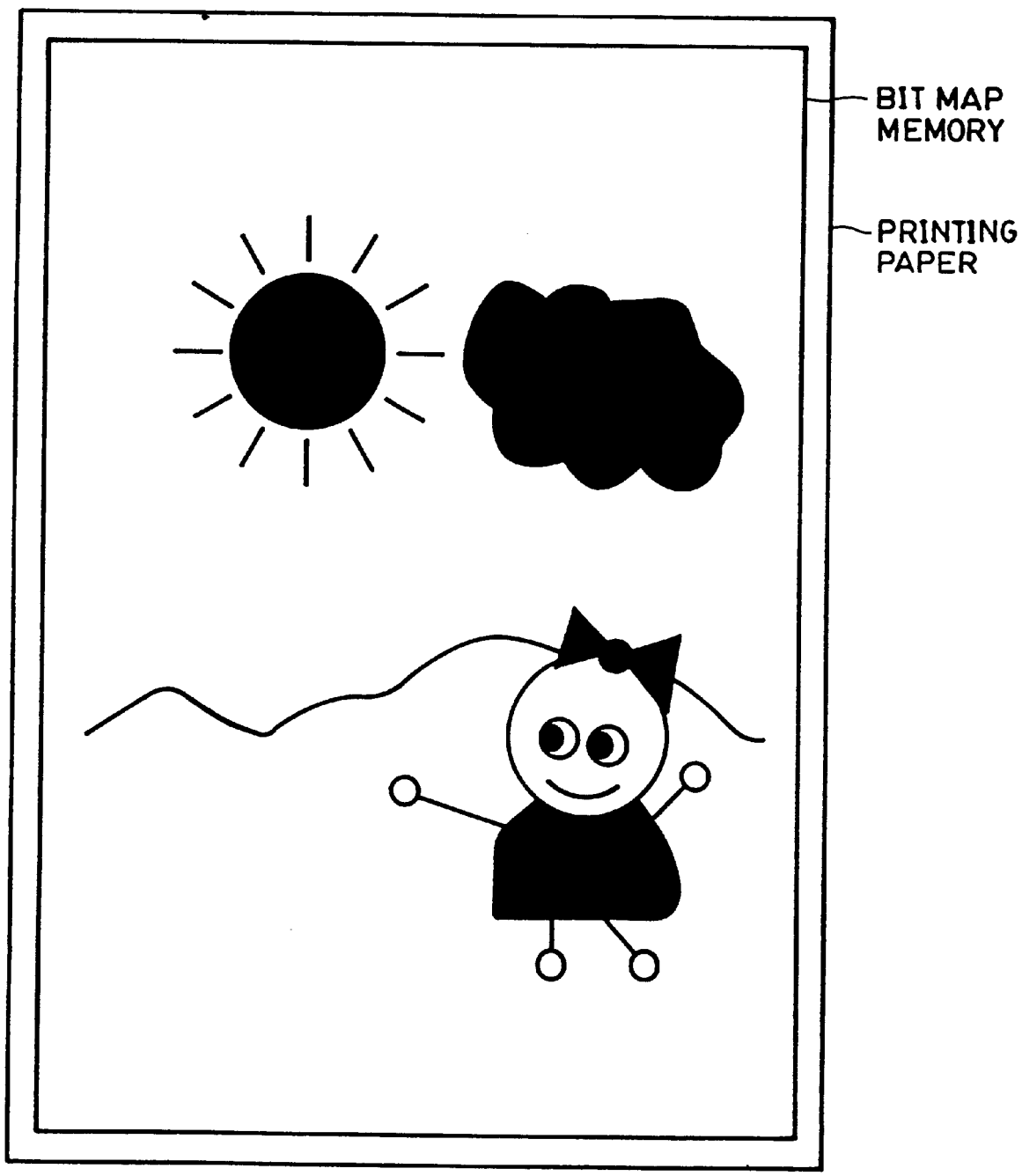
FIG. 3 illustrates a bit map memory for graphic data.

The processing procedure according to this embodiment will be described with reference to the flowchart shown in FIG. 2. The processing steps are denoted by numerals 1 to 23. Before starting the print processing of one page, the description mode is initialized (Step 1). The printing data from the host computer 1 is stored in the reception buffer 2112 (Step 2). The printing information processing unit 2111 retrieves one command from the reception buffer 2112 (Step 3). The printing information processing unit 2111 finds out whether the retrieved command is a command concerning text or graphic description processing (Step 4). If it is a description-concerning command, processing proceeds to Step 5.

At step 5, it is checked whether the description mode has been determined. If it has been determined, processing proceeds to Step 9 without changing description modes. If it has not been determined, the printing information processing unit 2111 checks whether the retrieved command is a text description command or a graphic description command (Step 6). If it is a text description command, the text description mode is selected (Step 7). If it is a graphic description command, the graphic description mode is selected (Step 8).

At Step 9, it is checked whether the determined description mode is the text mode or the graphic mode. If it is the graphic description mode, processing proceeds to Step 10, where the graphic description processing unit 2122 develops the received graphic description command into dot data on the bit map memory 2123 to describe one page of a low-density (300 dpi) image thereon. When the description processing is completed, the procedure returns to Step 2. If, on the other hand, the description mode is the text description mode, the text description processing is performed but first processing from Step 2 to Step 9 is repeated until a paper-discharge command is retrieved.

If it is determined that the retrieved command is not a command concerning the description processing at Step 4, the procedure goes to Step 11, where it is determined whether the command is a paper-discharge command. If it is not a paper-discharge command, the command analyzing unit 211 executes the command (Step 12), and the procedure returns to Step 2.

If it is determined that the command is a paper-discharge command at Step 11, the procedure goes to Step 13, where it is determined whether the mode is the graphic description mode or the text description mode.

In the graphic mode, the procedure goes to step 14, where the output processing is performed. In output processing, the output processing unit 2131 exchanges information, such as engine control commands or the status of various actions of the printer engine, with the engine control unit 22 and, thus, adjusts the timing of image transfer to the engine control unit 22. For example, the print resolutions at Step 17 and Step 21 are different from each other, and the appropriate resolution is set in output processing. The resolution can be changed by known means such as by varying beam clock frequency, and/or paper-feeding speed.

After output processing (Step 14), the content of the bit map memory 2123 is smoothed by the smoothing circuit 2132 (Step 15). The smoothed signals are converted to video signals to be outputted to the engine control unit 22 (Step 16). In smoothing-out processing, notches of the dot pattern are smoothed out, e.g. by reducing the diameter of the dots, in accordance with known technique such as those described in U.S. Pat. No. 4,878,068, the contents of which are incorporated herein by reference.

The engine control unit 22 performs print processing, i.e. controls various printing means of the printer engine unit 23 (Step 17). Then, the printer engine unit 23 forms a permanently visible image on recording paper and discharges such recording paper (Step 23). When the above-described processing is completed, the procedure returns to Step 1.

Figure 4:
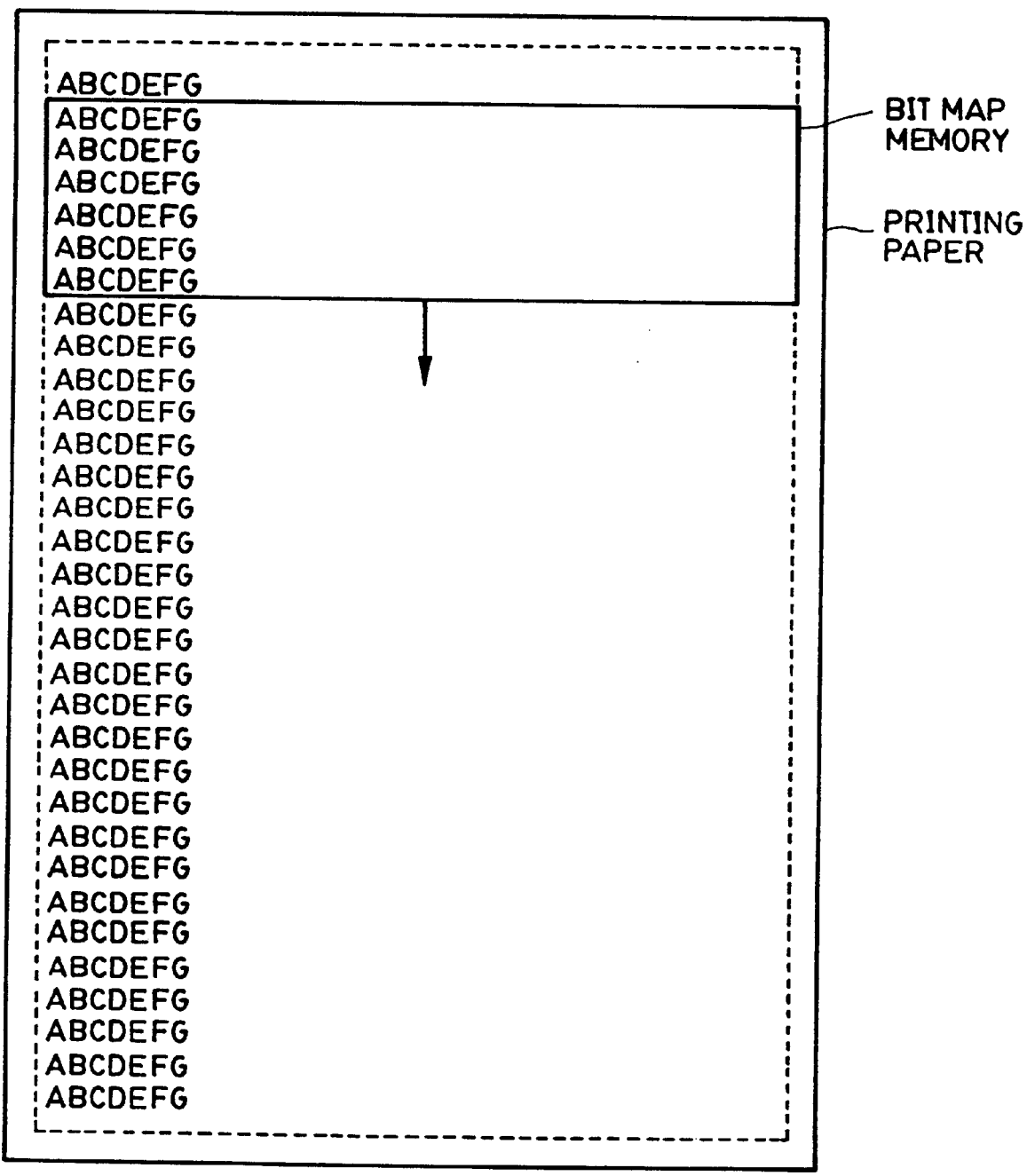
FIG. 4 illustrates a bit map memory for text data.

In the text description mode, the procedure goes from Step 13 to Step 18, where the text description processing unit 2121 develops dot data at a high-density image (600 dpi) from the retrieved text description command, on the bit map memory 2123. The capacity of the bit map memory 2123 is not so large as to store an entire page of a high-density image (600 dpi). Thus, the bit map memory 2123 stores, at any one time, only a portion (or band) thereof (e.g., a quarter of the page) defined by a virtual window assumed to move over the page of the printing paper on which the current printing is to be made, as shown in FIG. 4. In the text description mode, the above-mentioned description processing to the bit map memory 2123 is performed simultaneously with conversion processing of data to video signals and print processing. In other words, the virtual window moves in the direction indicated by the arrow in FIG. 4, at the same speed as the printing paper is conveyed. Processing of Steps 18 to 22 are simultaneously performed. At Step 19, the output processing unit 2131 exchanges information, such as engine control commands or the status of various actions of the printer engine, with the engine control unit 22 in order to adjust the timing of image transfer to the engine control unit 22. At Step 20, the dot data of the bit map memory 2123 is directly converted to video signals to be outputted to the engine control unit 22. At Step 21, the engine control unit 22 performs print processing by controlling various printing means of the printer engine unit 23. Also, the printer engine unit 23 prints a permanently visible image on the printing paper. The processing of Steps 18 to 21 is repeated until one page of the printing is completed (Step 22). When it is completed, the printed paper is discharged (Step 23).

When the above-described processing is completed, the procedure returns to Step 1.

[Another embodiment]

Figure 5:
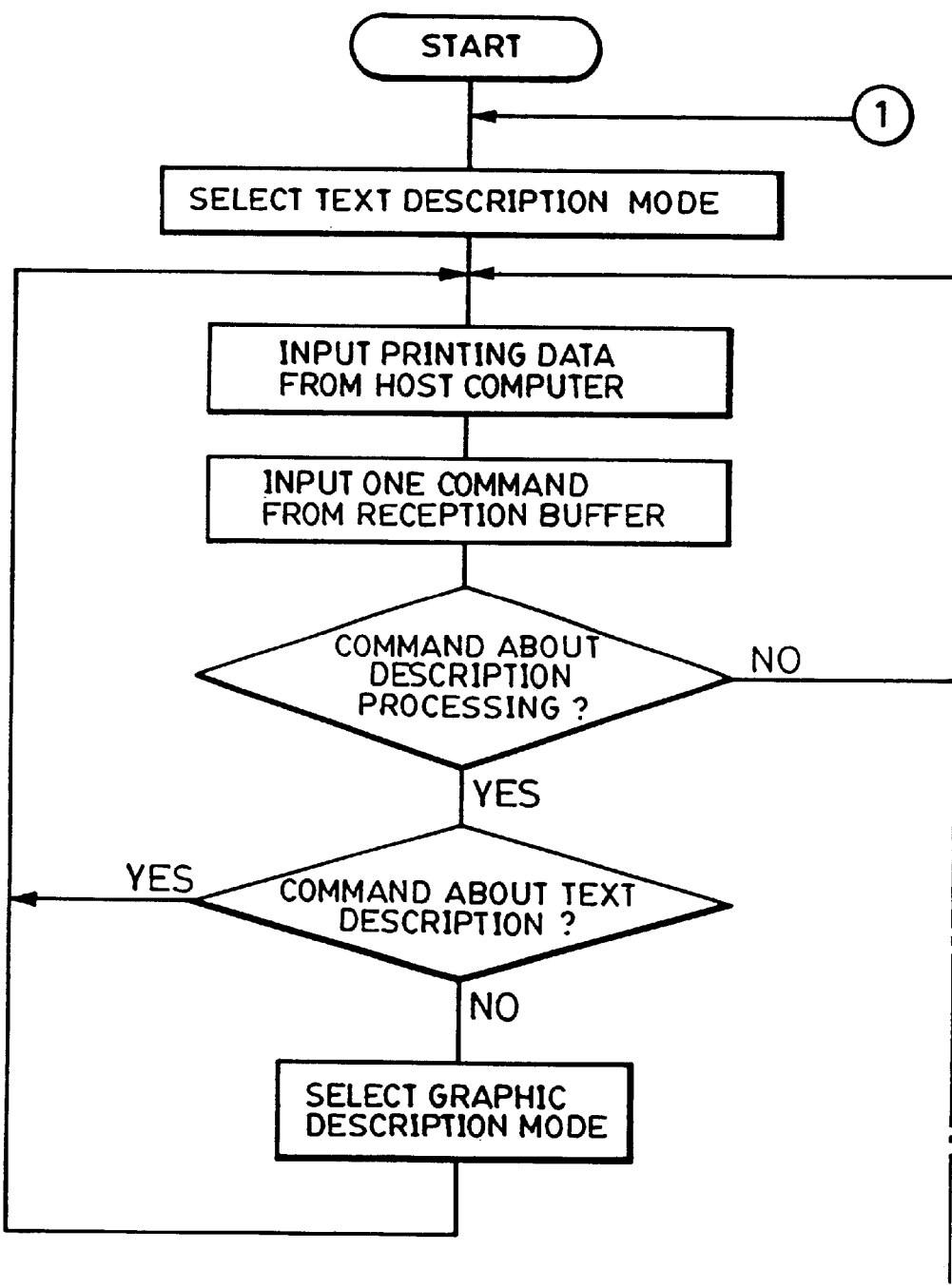
FIG. 5, comprising
Figure 5B:
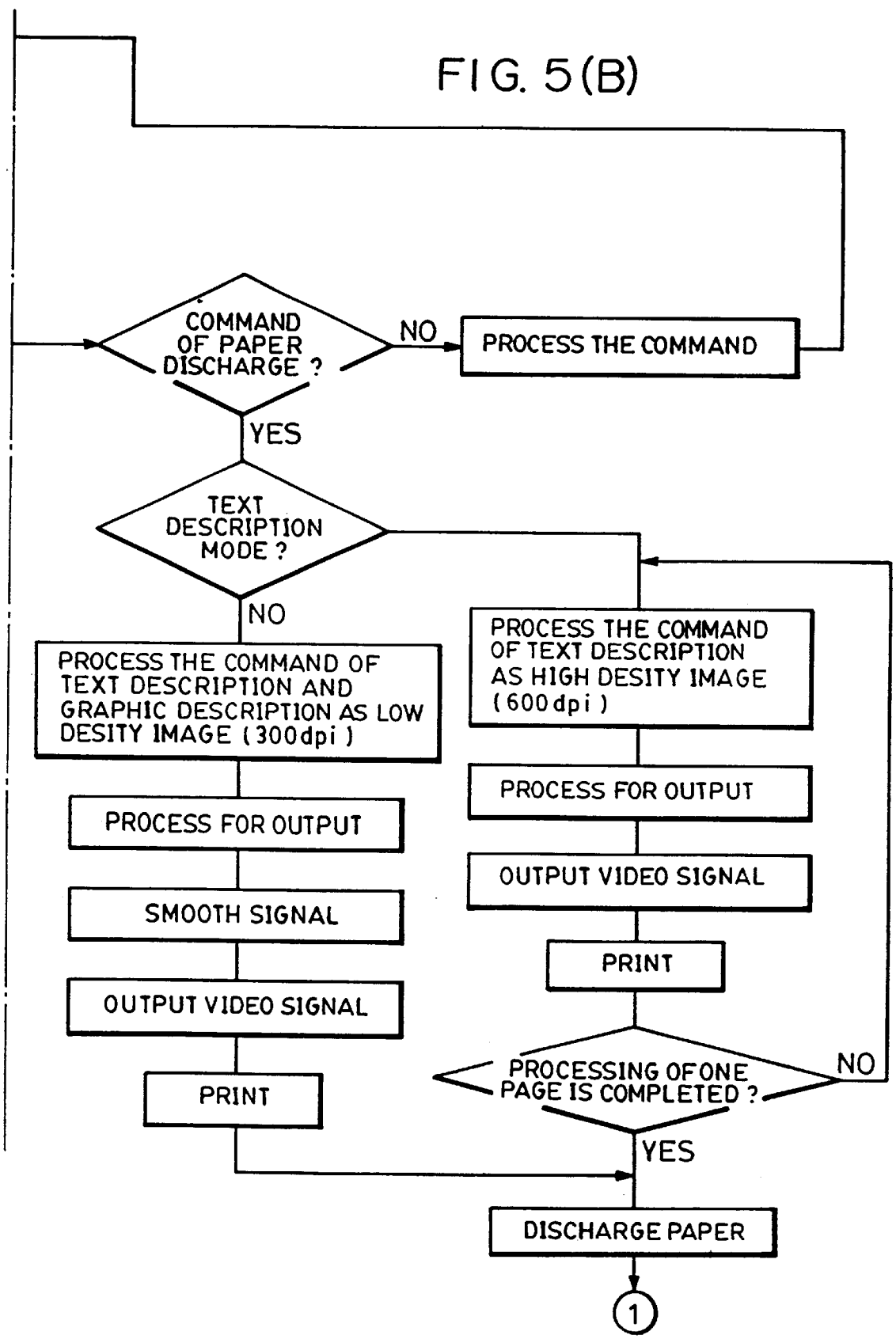

In the above embodiment, the description mode is selected according to the analysis of inputted information (e.g. expressed in page description language). In this embodiment as illustrated in FIG. 5, each command retrieved is examined whether it is a text description command or a graphic description command. If the one page of retrieved data are all text description commands, the one page of data are divided into portions to be serially developed as a high-density image (600 dpi) on the bit map memory (band processing) and to be serially printed. If the one page of retrieved data includes any number of graphic description commands, the one page of data are developed as a low-density image (300 dpi) on the bit map memory. The developed dot data are smoothed for outputting.

As described above, in an output method according to the present invention, the print density is changed according to the kind of printing. Therefore, if this method is employed, a bit map memory of large capacity is not required. Highly-defined printing can be performed by a high-density (600 dpi) laser beam printer employing a bit map memory having the same capacity as the bit map memory employed in a conventional printer controller of low-density printing (300 dpi).

An output method according to the present invention comprises the steps of: analyzing the information, e.g. from a host computer, to determine whether the information is text data or graphic data; in the case of text data, dividing one page of data into portions to develop the data as dot patterns of high resolution; and, in the case of graphic data, developing the entire page of data as a dot pattern of low resolution. Such divided text description processing does not cause inconvenient delay because the development of text data into dot patterns is quick, compared with that of graphic data and can be completed before the developed dot patterns are printed.

An output apparatus according to the present invention comprises: an analyzing means for analyzing the information inputted thereto; and a developing means which, according to the analysis by the analyzing means, develops text data as dot patterns of high resolution and graphic data as dot patterns of low density.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims.

What is claimed is:

1. A printer controller for generating and outputting image data, comprising:

input means for inputting information output from an external apparatus;

judging means for judging whether or not the inputted information includes specific control data; and control means for controlling switching of said printer controller between a plurality of modes based on whether the inputted information includes the specific control data, the plurality of modes including a first mode in which the image data is converted into a video signal in parallel with description processing of the image data and a second mode in which the image data is converted into the video signal after the description processing of one page of the image data is performed.

2. A printer controller according to claim 1, wherein the specific control data are description processing commands.

3. A printer controller according to claim 1, wherein, in the second mode, the image data is converted into the video signal after a smoothing process is completed.

4. A printer controller according to claim 1, wherein a resolution of the description processing in the second mode is lower than that of the description processing in the first mode.

5. A printer controller according to claim 1, further comprising printing means for forming a visible image on a recording medium based on the video signal.

6. A method of controlling a printer to generate and output image data, comprising the steps of:

inputting information output from an external apparatus;

judging whether or not the inputted information includes specific control data; and controlling switching of said printer between a plurality of modes based on whether the inputted information includes the specific control data, the plurality of modes including a first mode in which the image data is converted into a video signal in parallel with description processing of the image data and a second mode in which the image data is converted into the video signal after the description processing of one page of the image data is performed.

7. A method according to claim 6, wherein the specific control data comprise description processing commands.

8. A method according to claim 6, wherein, in the second mode, the image data is converted into the video signal after a smoothing process is completed.

9. A method according to claim 6, wherein a resolution of the description processing in the second mode is lower than that of the description processing in the first mode.

10. A method according to claim 6, further comprising the step of forming a visible image on a recording medium based on the video signal.

* * * * *